United States Patent [19]

Kurtz et al.

[11] 3,930,823
[45] Jan. 6, 1976

[54] HIGH TEMPERATURE TRANSDUCERS AND HOUSING INCLUDING FABRICATION METHODS

[75] Inventors: Anthony D. Kurtz, Englewood; Joseph R. Mallon, Jr., Woodridge, both of N.J.

[73] Assignee: Kulite Semiconductor Products, Inc., Ridgefield, N.J.

[22] Filed: May 7, 1973

[21] Appl. No.: 358,143

Related U.S. Application Data

[62] Division of Ser. No. 234,616, March 14, 1972, Pat. No. 3,800,264.

[52] U.S. Cl. ............................ 65/33; 65/43; 357/73
[51] Int. Cl. ............................................. C03c 29/00
[58] Field of Search ......... 317/234 (3.1); 65/33, 43; 357/73, 26

[56] References Cited
UNITED STATES PATENTS

| | | |
|---|---|---|
| 2,889,952 | 6/1959 | Claypoole ........................ 65/33 X |
| 3,404,319 | 10/1968 | Tsuji et al. .......................... 317/234 |
| 3,486,871 | 12/1969 | Martin ................................... 65/33 |
| 3,503,763 | 3/1970 | Mills ................................ 65/33 X |
| 3,533,832 | 10/1970 | Volder ......................... 317/234 UX |
| 3,662,312 | 5/1972 | Thorp et al. ........................... 338/4 |

Primary Examiner—Ronald J. Shore
Attorney, Agent, or Firm—Arthur L. Plevy

[57] ABSTRACT

A dielectrically isolated pressure transducer comprises a silicon diaphragm having on a surface thereof at least one piezoresistive sensor mounted in close proximity with a dielectric insulator, the diaphragm is secured about a non-active peripheral area to an annular ring housing by a glass bond fabricated from a glass material having a low melting temperature when compared to ordinary glass.

5 Claims, 6 Drawing Figures

HIGH TEMPERATURE TRANSDUCERS AND HOUSING INCLUDING FABRICATION METHODS

This is a division of application Ser. No. 234,616 filed on March 14, 1972, now U.S. Pat. No. 3,800,264, 3/26/74.

This invention relates to high temperature, pressure transducers and more particularly to methods for fabricating and novel structures associated with such transducers.

BACKGROUND OF INVENTION

Due to more stringent applications there is a need for pressure transducers capable of operating at high temperature, while further being of small physical dimensions to enable use of the same in small areas.

Such uses exist in many areas, such as satellite applications, nuclear power, chemical processing, aerodyromics, engine testing and so on.

The semiconductor piezoresistive transducers are in widespread application due to the high output signals available.

The high signal output is desirable, and coupled with this is the fact that when one wishes to provide small transducers (less than ⅛ inch in diameter) the use of semiconductor technology is essential.

The prior art is replete with various techniques for fabricating such transducers.

Certain techniques use organic epoxy adhesives to bond several sensors to a central, metal diaphragm. The metal diaphragm deflects under force and the transducers bonded thereon sense the surface strains on the diaphragm. Difficulties at high temperature operation are paramount due to the "plastic" behavior of the epoxy; and sensors which use epoxy exhibit hysterisis and zero instability. Both terms indicating that such a transducer would exhibit varying quiescent condition operation due to such temperature changes.

With the introduction of monolithic devices, sensors were fabricated integrally with a silicon diaphragm. The integral configuration permitted higher temperature operation; but at temperatures of about 350°F the isolation between the sensors and the substrate deteriorated. This was caused by thermally generated carriers which served to short circuit the sensors to the substrate.

It is therefore an object of this invention to provide improved pressure transducers and techniques for fabricating the same capable of operating at high temperatures. Such transducers being capable of operating at temperatures above 600°F.

A preferred embodiment of the invention comprises a pressure transducer comprising a silicon disc-like diaphragm having located on a first surface thereof at least one dielectric insulating member, said insulating member having a piezoresistive sensor element on a surface thereof to thereby form a composite transducer structure wherein said sensor is dielectrically isolated from said diaphragm, an annular ring housing generally cylindrical in shape having an open top end of a diameter less than the diameter of said disc and a glass bond coupling said disc to said housing, located about the periphery of said disc, with the area defined by said open top end of said housing surrounding said sensor.

Further embodiments include methods of securing pressure transducing assemblies to housing for high temperature operation.

BRIEF DESCRIPTION OF DRAWINGS

Referring to FIG. 1, there is shown a pressure transducer which is capable of high temperature operation and is fabricated according to certain novel techniques which will be described subsequently. Numeral 10 references an epitaxial silicon diaphragm. The diaphragm has deposited on the surface thereof a first oxide layer 11 and a second oxide layer 12. As can be seen the layers 11 and 12 emanate from and extend above the diaphragm 10. Positioned on each oxide layer as 11 and 12 are single crystal sensors 14 and 15. These sensors for example may be semiconductor piezoresistive elements. The use of such piezoresistive elements in sensing stress and strain are well known in the art. Such devices have been used in a great many applications as stress and strain gages. For an example of such gage configurations as well as the implementation of such devices, references can be made to a publication entitled "Semiconductor Transducers Using Transverse And Shear Piezoresistance" by Anthony D. Kurtz and Charles L. Gravel published by the Instrument Society of America, Preprint No. P4–1PHYMM 10–67 (1967).

Despite the widespread use of such piezoresistive elements in transducing assemblies difficulty was encountered in using such devices in high temperature operation. The reason is that the isolation in prior art devices between the sensing element and the silicon substrate was effective only up to certain temperatures. The reason that these devices failed to operate at relatively high temperatures was that thermally generated carriers were produced which effectively shorted the substrate. Since the response of the transducer depends on the relative junction isolation, it is therefore desirable to maintain a junction in such devices at as high a temperature as possible. Basically, the transducer shown in FIG. 1 can be referred to generally as a dielectrically isolated device. Such devices are well known but as will be explained the device of FIG. 1 differs in many respects to those shown in the prior art.

The advantages of using dielectric isolation in the fabrication of transducers are many. Dielectric isolation provides higher temperature operation in general because the silicon dioxide insulation resistance is relatively unaffected by temperature. Hence, the fundamental thermal limitation on device performance will be that temperature at which the piezoresistive elements no longer exhibit repeatable and useful piezoresistive properties (i.e., greater than 800°C). The difficulty with such devices is that fabrication is inherently more difficult as well as geometric or dimensional control as compared to the monolithic devices of the prior art. Hence, these devices suffer in that the overall geometry of the sensor is affected and therefore one can anticipate variations from device to device.

Figure 1:
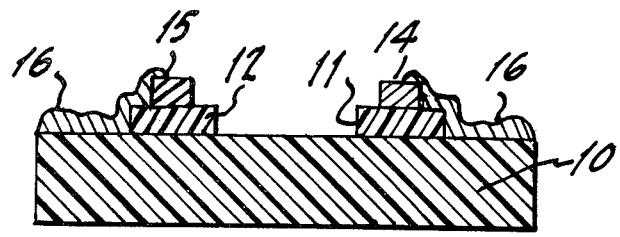
FIG. 1 is a sectional side view of a pressure transducer according to this invention.

In the configuration shown in FIG. 1, the oxide layers 11 and 12 are directed upwards from the surface of the silicon diaphragm 10. This particular configuration as will be further explained, therefore permits a closer control of geometric structure. In fabricating the device shown, the first step in the procedure would be to first grow a layer of silicon dioxide approximately 10,000 to 15,000 angstrom units thick on the surface of a silicon wafer. This can be accomplished by a thermal oxidation process. The process is known and uses an oxidation furnace operating at about 1150°C, to heat silicon wafers located within a quartz tube in a high oxygen or steam atmosphere. The next step is to now deposit a relatively thick layer of polycrystalline silicon by epitaxial techniques. The function of the polycrystalline layer is to provide a support for the single crystal regions which are to be the strain sensors. A basic chemical reaction which can be used for the growth of epitaxial silicon is the hydrogen reduction of silicon tetrachloride. This reaction takes place only at a surface and can be arranged to occur only on the oxidized surface of the wafer. The growth rate of the epitaxial layer is dependent upon the flow rate of the silicon tetrachloride, the ratio of hydrogen and the temperature. The next step would be to preferentially remove the undesired single crystal silicon and oxide portions. The removal can be accomplished by a photolithographic method. This method is conventionally utilized to remove silicon or silicon dioxide from predetermined areas in conjunction with an etching technique. Thereafter, the sensor can be fabricated with a minimum of difficulty by conventional mechanical lapping and photolithographic chemical milling techniques.

Figure 2:
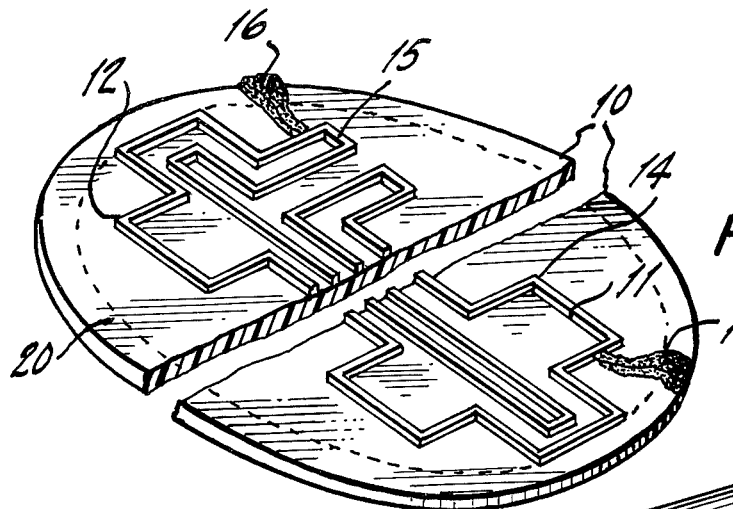
FIG. 2 is a top perspective view of a pressure transducer.

FIG. 2 shows a perspective view of such a sensor wherein the sensor is shown separated at the center portion thereof to expose the raised oxide layers which are the support members for the piezoresistive transducing elements.

For examples of how such epitaxial devices can be constructed, reference is further made to the following papers entitled "Development and Application of High Temperature UltraMiniature Pressure Transducers" by Anthony D. Kurtz and John Kicks and "Advances in High Temperature Ultra-Miniature Transducers" by Joseph Mallon and Damon Germanton, both presented at the ISA Silver Jubilee Conference, October 1970, Philadelphia, Pa.

A further problem which will be explained is the implementation of contacts to the sensing arrangements. Referring again to FIG. 1 and FIG. 2, there is shown contacts 16 which are platinum contacts and are deposited upon the wafer assembly.

The contacts are preferably fabricated from platinum because of its good conductivity and temperature characteristics, however other metals which are suitable are molybendum and tungsten or any metal which does not react metalurgically with silicon at the desired operating temperature and can be made to form an ohmic contact.

Platinum is sputtered by an RF sputtering process and the platinum is reacted with the silicon of the diaphragm 10 to form platinum-silicide. The platinum silicide is then overlayed with another layer of platinum, to thereby form the contact areas 16. On then can bond platinum leads to the platinum metallized contact areas 16. This assures an adequate contacting surface to which additional leads can be attached by welding, brazing, soldering or other materials.

In general, the fabrication of the dielectrically isolated structure as shown in the figures provides a diaphragm 10 with piezoresistive sensors 14 and 15, which are isolated from the diaphragm by the silicon dioxide mounts 12 and 11. The combination has high temperature platinum lead or lead contact areas 16. This therefore provides a transducing assembly, whereby the resultant structure provides the following advantages:

1. Transducer exhibits negligible creep or hysterisis at elevated temperatures;
2. The maximum operating temperature is basically a function of the lead attaching process;
3. Individual sensors comprising a bridge arrangement on the diaphragm are relatively isolated one from the other by the insulator silicon dioxide, which has a high resistivity ($10^{10}$ ohm-cm). Moreover, the dielectric properties of silicon dioxide are essentially independent of temperature over a greater range and useful isolation exists at temperatures in excess of 1500°F.

However, these advantages must further be maintained when such a dielectrically isolated transducer is coupled to a housing. Briefly referring to FIG. 2, there is shown a dashed line 20 of a smaller diameter than the diameter of the transducer. The transducer, in order to operate in a particular environment, is associated with a housing used for maintaining the transducer in a fixed position and further effective to aid in the direction and location of leads and so on. It is important that the edges of the diaphragm be well bonded, since a simply supported diaphragm will have significantly lower sensitivity than a clamped diaphragm. In addition the seal or bond must exhibit good mechanical properties and be leak-free even at elevated temperatures. The diaphragm of FIG. 2 is clamped or bonded to a housing within the area between the dashed line 20 and the periphery of the disc-like diaphragm. This clamping area is sometimes referred to as the non-active area, as compared to the active area of the diaphragm. The active area being that area which deflects upon application of a force to the diaphragm.

As can be seen the active area includes the piezoresistive sensing elements, while the non-active area includes the larger area of the contacts 16. The advantages of using this type of construction are discussed in greater detail in a patent application entitled "Electromechanical Transducers and Housings", Ser. No. 36,169, now U.S. Pat. No. 3,654,579, filed on May 11, 1970 by Anthony D. Kurtz, Joseph Mallon and Charles Gravel and assigned to the same assignee herein.

Basically, the bonding of the diaphragm to the housing has to be done in a manner to retain high temperature operating capability as afforded by the dielectrically isolated transducer assembly.

Figure 3:
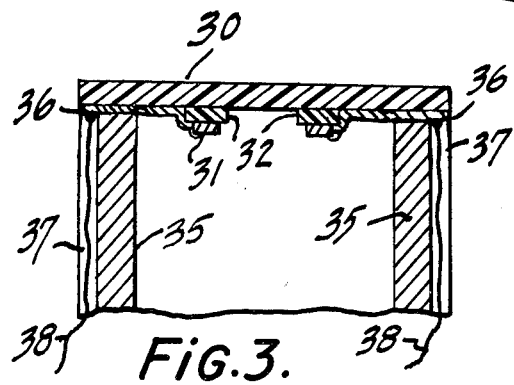
FIG. 3 is a side elevation cross-sectional view of a pressure transducer coupled to a housing.
Figure 4:
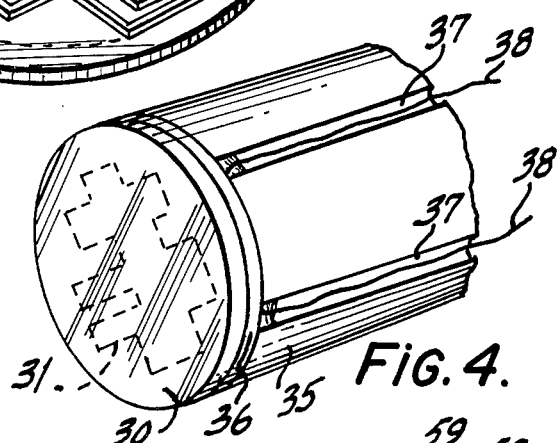
FIG. 4 is a perspective view of a pressure transducer and housing arrangement.

Referring to FIGS. 3 and 4 there is shown a transducer assembly 30 fabricated as a dielectrically isolated configuration, where piezoresistive sensors 31 are found on insulating blocks 32.

An annular housing 35 is shown. The housing 35 is fabricated from a ceramic or high temperature steel alloy as kovar. A bond 36 secures the diaphragm transducing assembly 30 to the housing 35.

As indicated, the properties of this bond 36 are important to the overall high temperature performance of the unit.

The bond 36 is formed by a material known as solder glass. Such glasses have relatively low melting points, as pyroceram, manufactured and distributed by the Corning Glass Company. These glasses are thermosetting and devitrify at a temperature compatible with temperatures (450°C) associated with lead attachment techniques. Upon devitrification, the glass develops a crystalline structure which results in a strong seal as the crystallized material's softening point is higher than conventional glass.

In prior art techniques of bonding the diaphragm 30 to the housing 35 an organic epoxy adhesive could be used. Such adhesives have good mechanical properties within their design limits. However, as operating temperatures are increased, they begin to exhibit plastic behavior causing hysterisis and zero instability for the transducer assembly.

Solder glass on the other hand exhibits excellent mechanical properties at temperatures well in excess of 600°F ambients.

Heating the solder glass to a temperature above the softening point causes the glass to flow, and as the heating is continued, crystals nucleate and grow. The rate of the crystal growth is temperature dependent as the higher the temperature, the faster the crystal growth. Upon reheating (even to temperatures above the initial curing cycle), the bond remains stable.

The formation of a good, high temperature bond between the silicon transducer and the metal housing 35 is dependent upon the control of several basic steps.

The finely powdered solder glass is mixed with a proper suspension vehicle, such as a mixture of nitrocellane in anylacetate, to a desired consistency to form a paste-like mixture or frit. This frit is then placed about the top edge of the annular cylinder 35, in that area on which the transducer is to be bonded. The semiconductor transducer 30 is then placed in position over the top edge of the housing 35, to contact the area where the frit is placed, which is within the non-active area of the diaphragm. The structure is heated for about forty-five minutes at 170°F to insure full evaporation of the suspension vehicle or solvent. Finally, the structure is fired at about 800°F for about forty-five minutes.

This process provides a good bond between the housing 35 and transducer 30. However, when a semiconductor transducer as 30 is bonded to a metal housing having a larger coefficient of linear expansion, and the bond 36 therebetween is made with an intermediate material such as glass, that is cured at an elevated temperature, the gage will be subjected to compressive strain when cooled to room temperature. This is undesirable, since the sensitivity of the gage is somewhat nonlinear under high compressive stress. However, this characteristic can be accounted for in the design technique and alloted for.

The assembly, shown in FIGS. 3 and 4 have slots 37 in the sidewall of the cylindrical housing for accommodating wires 38. The advantages of such slots for the direction of wires from the assembly are further explained in the above-noted patent application.

Figure 5:
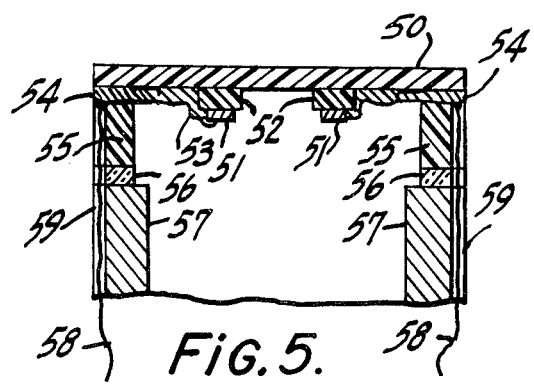
FIG. 5 is a side elevational view in cross section showing a pressure transducer coupled to a housing utilizing an intermediate silicon ring.
Figure 6:
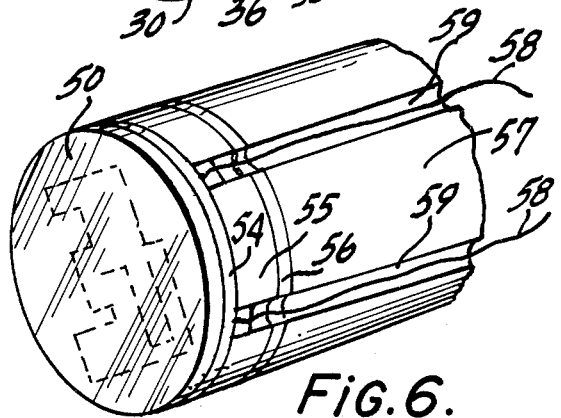
FIG. 6 is a perspective view of the transducer assembly of FIG. 5 showing slotted wire accommodating portions in greater detail.

Referring to FIGS. 5 and 6, there is shown a transducer 50 of the dielectrically isolated type, having silicon dioxide insulating support members 52 located on a surface of the silicon diaphragm, with piezoresistive sensors 51 fabricated thereon. Platinum contact areas 53 emanate from the sensors 51 and are directed to the periphery of the disc-like diaphragm as shown in FIG. 2.

The diaphragm 50 is bonded to an intermediate slotted annular housing or ring 55 by means of a solder glass bond 54. The ring 55 may be fabricated from silicon or quartz. The intermediate ring 55 has slots therein which communicate with the wire accommodating slots 59 of the metal housing 57. The annular ring 55 is likewise bonded to housing 55 via a glass bond 56 as above described.

The function of the ring 55 is important to alleviate the above-noted compression force disadvantage.

The intermediate ring serves to provide improved thermal matching between the housing 57 and the diaphragm 50. A metallic housing 57 typically has a higher coefficient of expansion than the silicon disc, therefore, if a seal is accomplished at an elevated temperature, a compressive force is exerted on the dielectrically isolated sensor, resulting in a distortion which causes a deterioration in transducer characteristics. The intermediate ring fabricated from silicon or quartz, or other materials having lower expansion properties than the housing serve to provide thermal matching to thereby greatly alleviate the diaphragm from the undesirable thermal forces. Quartz even has a lower expansion property then silicon and serves to slightly tense the diaphragm after the glass bonding process. Such a pretension is desirable to provide for more reliable operation.

It is understood that various other approaches to structures are known in the art, such as silicon on sapphire, silicon on spinel or on glass. Another technique known as anodic bonding can be used, see for example, U.S. Pat. No. 3,397,278, entitled "Anodic Bonding" by Daniel I. Pomeranz, issued Aug. 13, 1968 and assigned to P. R. Mallory and Company. This invention is not to be limited by the fabrication techniques of such transducers without regard to the bonding of the same to the housings and alternate structures, as further defined and covered by the claims presented herein.

We claim:

1. A method for securing a disc-like diaphragm of the type having located on the surface thereof, a dielectrically isolated piezoresistive sensing element, to a silicon annular ring housing, said silicon ring having a substantially lower expansion property than a metal, comprising the steps of:
   a. mixing a fine powdered solder glass compound with a suspension vehicle to thereby form a frit of a paste-like consistency,
   b. placing the frit about the top periphery of said silicon annular ring,
   c. securing the diaphragm in congruency with the annular ring with the sensing element positioned in the aperture,
   d. heating the structure for a predetermined period at a first elevated temperature to insure full evaporation of said suspension vehicle,
   e. heating the bonded diaphragm and ring at a second higher temperature for a second period to provide a bond between said diaphragm and said ring, said bond having a crystalline structure, and
   f. solder glass bonding said silicon annular ring to a second housing of an annular configuration, fabricated from a metal.

2. The method according to claim 1 wherein said first period is for approximately forty-five minutes at a temperature of about 170°F.

3. The method according to claim 1 wherein said second higher temperature is about 800°F and said second period is also about forty-five minutes.

4. The method according to claim 1 wherein said solder glass is of the thermosetting type having a relatively low melting point when compared with ordinary glass.

5. The method according to claim 1 wherein said suspension vehicle is a mixture of nitrocellane and anylacetate.

* * * * *